(12) United States Patent
Sekita

(10) Patent No.: US 6,833,967 B2
(45) Date of Patent: Dec. 21, 2004

(54) LENS SYSTEM AND IMAGE PICKUP DEVICE HAVING THE SAME

(75) Inventor: Makoto Sekita, Kanagawa (JP)

(73) Assignee: Canon Ka-ushiki, Tokyo (JP)

( * ) Notice: Subject to any disclaimer, the term of this patent is extended or adjusted under 35 U.S.C. 154(b) by 32 days.

(21) Appl. No.: 10/436,333

(22) Filed: May 12, 2003

(65) Prior Publication Data

US 2003/0218808 A1 Nov. 27, 2003

(30) Foreign Application Priority Data

May 15, 2002 (JP) ........................................ 2002-139922

(51) Int. Cl.[7] ............................ G02B 9/60; G02B 13/04
(52) U.S. Cl. ...................................... 359/770; 359/753
(58) Field of Search .............................. 359/770, 749, 359/753, 740; 348/335

(56) References Cited

U.S. PATENT DOCUMENTS

| | | | | |
|---|---|---|---|---|
| 6,353,509 | B1 * | 3/2002 | Nakazawa | 359/756 |
| 2003/0112529 | A1 * | 6/2003 | Sekita | 359/770 |
| 2003/0142416 | A1 * | 7/2003 | Chen | 359/753 |

FOREIGN PATENT DOCUMENTS

| | | |
|---|---|---|
| JP | 63/081414 | 4/1988 |
| JP | 03/063613 | 5/1991 |
| JP | 07/124194 | 5/1995 |
| JP | 10/213742 | 8/1998 |
| JP | 10/293246 | 11/1998 |
| JP | 2001/100091 A | 4/2001 |

* cited by examiner

Primary Examiner—Georgia Epps
Assistant Examiner—Alicia M. Harrington
(74) Attorney, Agent, or Firm—Morgan & Finnegan LLP

(57) ABSTRACT

Disclosed is a lens system which includes a first lens of negative optical power having a meniscus shape whose convex surface faces a front, a second lens of positive optical power forming a biconvex shape, an aperture stop, a third lens of negative optical power forming a biconcave shape, a fourth lens of positive optical power, and a fifth lens of positive optical power forming a biconvex shape, which are disposed in order from the front to a rear. Lens intervals, materials composing the lenses, and the like are specified, thereby obtaining a lens system in which a sufficient back focal distance is kept, and which is small in size, low in cost, and satisfactory in optical performance.

6 Claims, 13 Drawing Sheets

LENS SYSTEM AND IMAGE PICKUP DEVICE HAVING THE SAME

BACKGROUND OF THE INVENTION

1. Field of the Invention

The present invention relates to a retro focus type lens having a short entire length which is suitable for an image pickup device such as a video camera or a digital still camera.

2. Related Background Art

In recent years, various video cameras and various digital still cameras, each having a solid-state image pickup element such as a CCD sensor or a CMOS sensor have been developed. In such kinds of image pickup devices, various glass materials such as a low pass filter and a color filter are disposed between the trailing end of the photographing lens and the image pickup element in many cases. Thus, as compared with a focal length, it is necessary to lengthen a back focal distance.

As a type of a lens having a long back focal distance, a retro focus type lens has been known up to now. For example, a retro focus type lens composed of five lenses, that is, a first lens having a negative meniscus shape whose convex surface faces an object side, a second biconvex lens, a third biconcave lens, a fourth lens having positive refracting power, and a fifth biconvex lens, which are disposed in order from the object side is disclosed in JP 46-024194 B. According to a numerical embodiment in this document, the back focal distance becomes about 1.3 times than that of the focal length.

Also, in recent years, according to the trend toward increasing the number of pixels of the solid-state image pickup element, the performance required for the photographing lens has been extremely increasing. For example, JP 63-081414 A, JP 03-063613 A, JP 10-213742 A, JP 10-293246 A, JP 2001-100091 A, and the like disclose retro focus type lenses in which a high imaging performance and a long back focal distance can be attained together, and the lenses are composed of five lenses, that is, a negative lens, a positive lens, a negative lens, a positive lens, and a positive lens.

Here, in the case of the structure of, the five lenses, that is, the negative lens, the positive lens, the negative lens, the positive lens, and the positive lens, when an interval between the first lens and the second lens is narrowed, it is difficult to obtain a sufficient back focal distance. Thus, if the back focal distance is forcedly lengthened, the power of the first lens becomes stronger, so that aberration correction becomes difficult and the sensitivity of performance deterioration resulting to parallel and tilt eccentricities of the first lens becomes higher. Conversely, if the interval is widened, the outside diameter of the first lens is made large and the back focal distance is made too long. Thus, a problem in that a size of the entire lens is increased is caused.

According to JP 63-081414 A and JP 10-293246 A, the interval between the first lens and the second lens is relatively narrow, so that it is advantageous to reduce the size of the lens. However, aberration correction is difficult.

Also, as to an interval between the second lens and the third lens, when the interval is narrowed, it is difficult to dispose a stop between the second lens and the third lens. Thus, a sufficient exit pupil distance cannot be obtained. Conversely, if the interval is widened, a lens diameter of the entire lens is made large and a height in which an off-axis light flux is passed becomes relatively higher. As a result, a problem in that the correction of off-axis aberration becomes difficult is caused.

According to JP 10-213742 A and JP 2001-100091 A, the interval sufficient to dispose only the stop is kept between the second lens and the third lens. However, when it is considered that a mechanical shutter unit is further disposed, it cannot be said that the sufficient interval is kept. In addition, in the case of the video camera or the digital still camera, it is necessary to lengthen the back focal distance. However, the back focal distance longer than is necessary is not preferable because the entire length of the photographing lens becomes longer.

According to JP 03-063613 A, the back focal distance is equal to or more than 1.2 times as long as the focal length. Thus, there is a problem with respect to the entire length of the photographing lens. In addition, a retro focus type lens which is composed of five lenses, that is, the negative lens, the positive lens, the negative lens, the positive lens, and the positive lens and in which further performance improvement is achieved using an aspheric surface has been proposed in, for example, JP 09-166748 A.

According to JP 09-166748 A, one surface of the fifth lens disposed in the nearest side of an image is formed to be an aspheric surface, thereby satisfactorily correcting particularly various off-axis aberrations.

SUMMARY OF THE INVENTION

An object of the present invention is to provide a lens system in which the above-mentioned conventional defects are solved, and a sufficient back focal distance is kept, and which is small in size, low in cost, and satisfactory in an optical performance.

In order to achieve the above-mentioned object, a lens system according to one aspect of the present invention includes a first lens of negative optical power (reciprocal of focal length) having a meniscus shape whose convex surface faces the front, a second lens of positive optical power forming a biconvex shape, an aperture stop, a third lens of negative optical power forming a biconvex shape, a fourth lens of positive optical power, and a fifth lens of positive optical power forming a biconvex shape, which are disposed in order from the front (object side in the case of the photographing lens) to the rear (image side in the case of the photographing lens), the lens system being characterized in that the following conditions are satisfied.

$$0.5 < DB/f < 0.8 \tag{1},$$

$$nd2 < 1.7 \tag{2},$$

and $$0.8 < bf/f < 1.0 \tag{3},$$

where
- DB denotes an interval between the second lens and the third lens,
- nd2 denotes a refractive index of a material composing the second lens,
- bf denotes a back focal distance, and
- f denotes a focal length of the entire system.

In further another aspect of the lens system, it is preferable that the following conditions are further satisfied.

$$0.6 < DA/f < 1.0 \tag{4},$$

$$0.45 < fA/fB < 0.7 \tag{5, and}$$

$$1.4 < f5/f4 < 2.0 \tag{6},$$

where

DA denotes an interval between the first lens and the second lens, fA denotes a total focal length from the first lens to the second lens, fB denotes a total focal length from the third lens to the fifth lens, f4 denotes a focal length of the fourth lens, and f5 denotes a focal length of the fifth lens.

DESCRIPTION OF THE PREFERRED EMBODIMENTS

Figure 1:
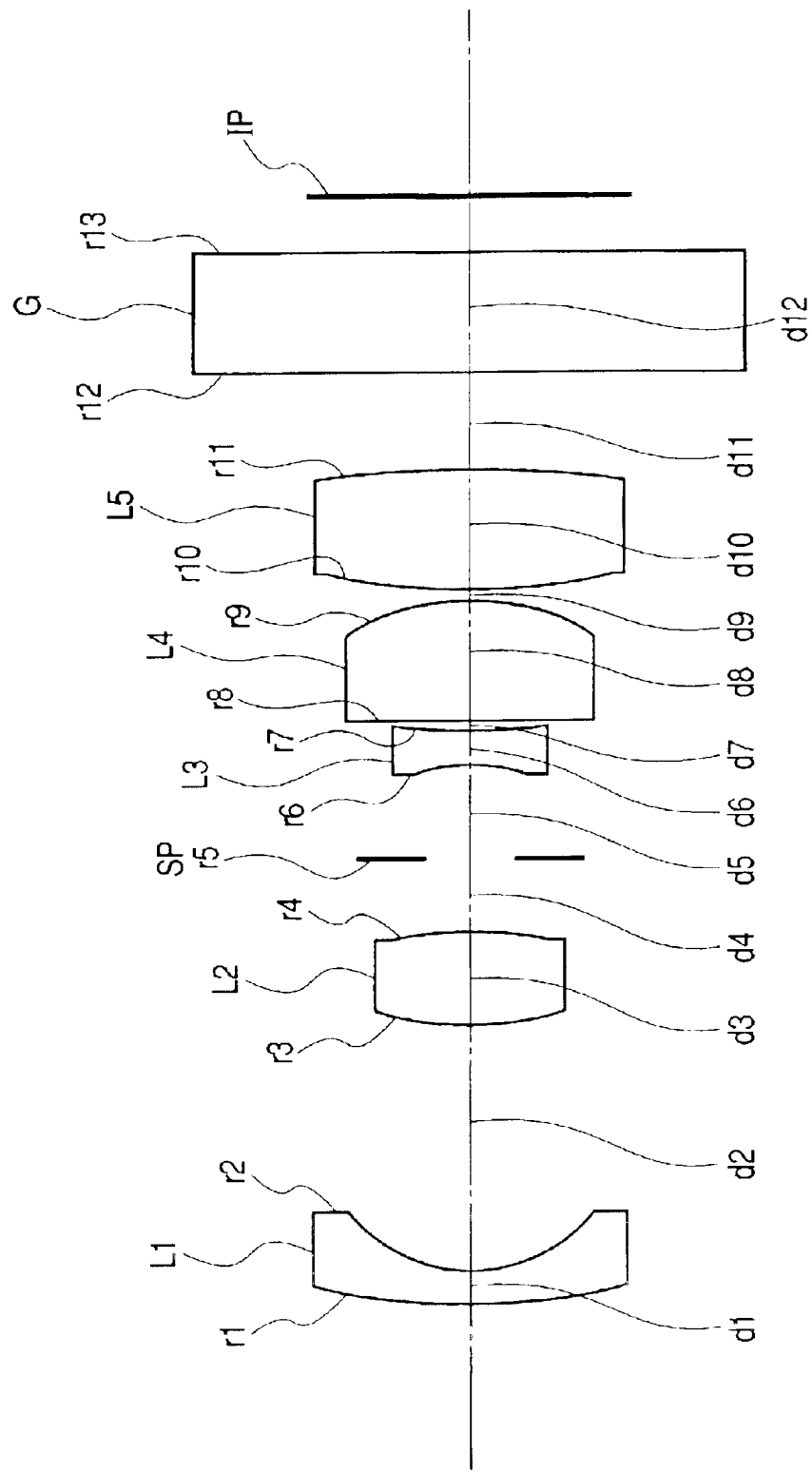
FIG. 1 is a lens sectional view of a lens system of Numerical Embodiment 1.
Figure 2:
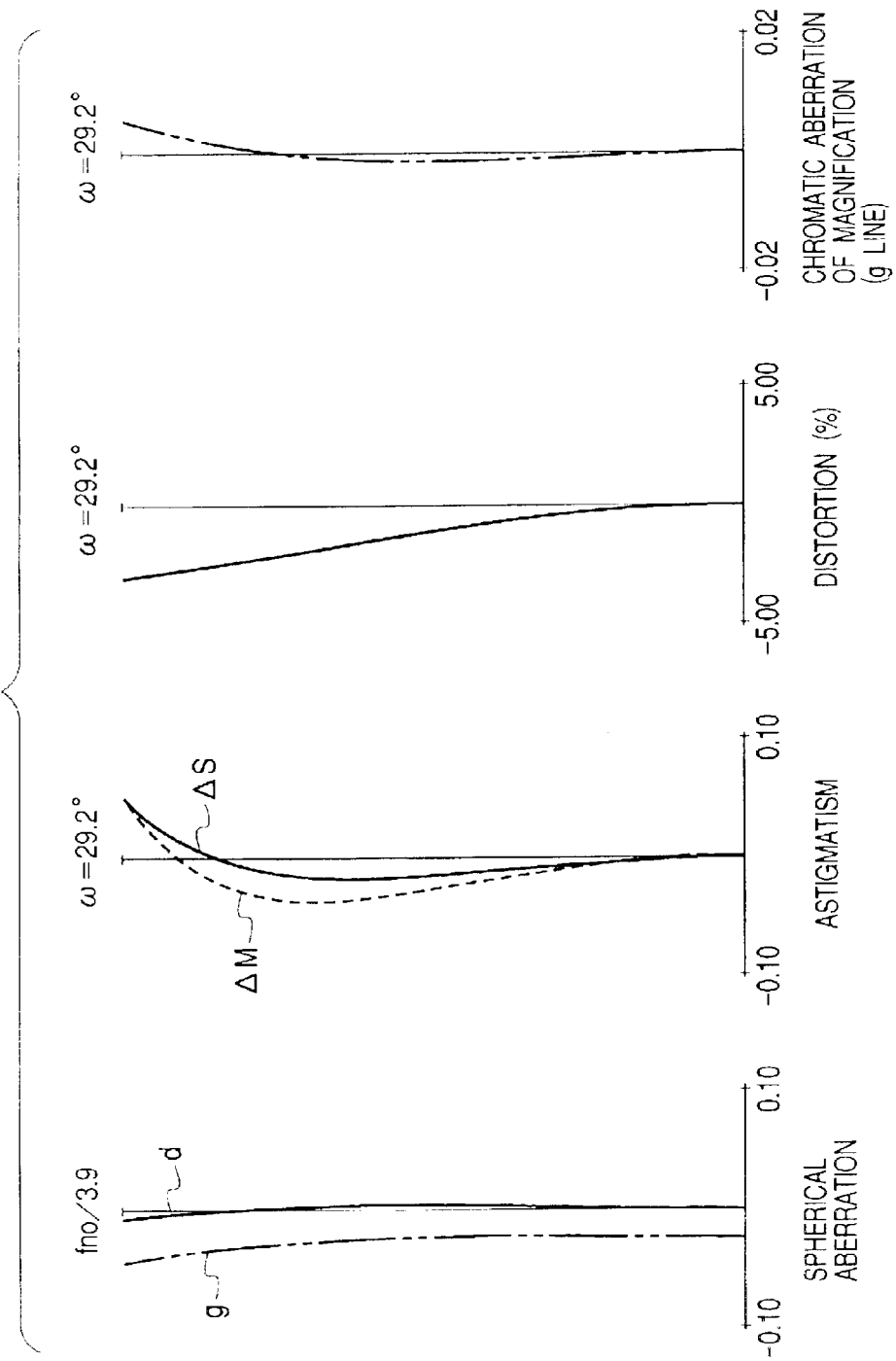
FIG. 2 shows various aberrations of the lens system of Numerical Embodiment 1.
Figure 3:
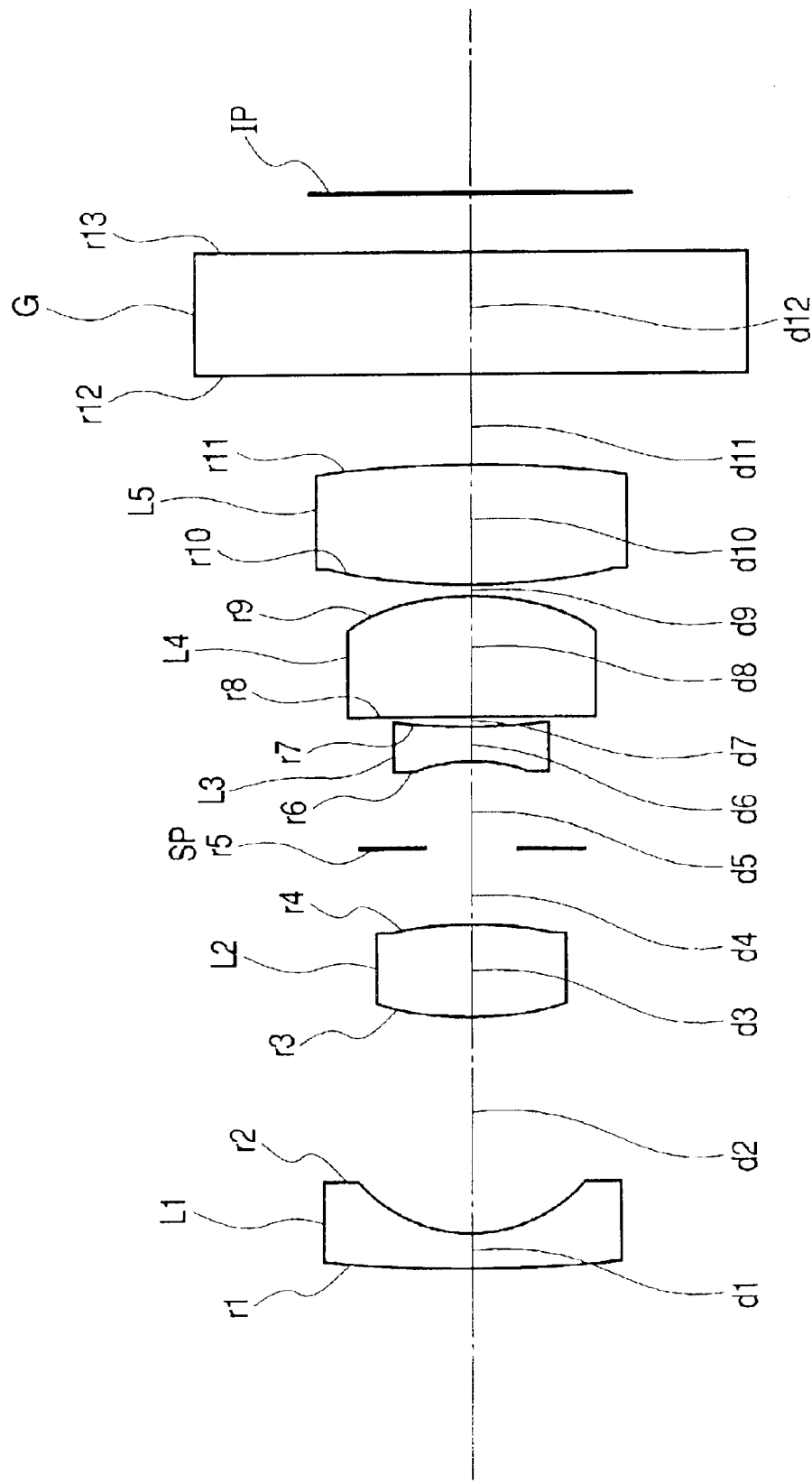
FIG. 3 is a lens sectional view of a lens system of Numerical Embodiment 2.
Figure 4:
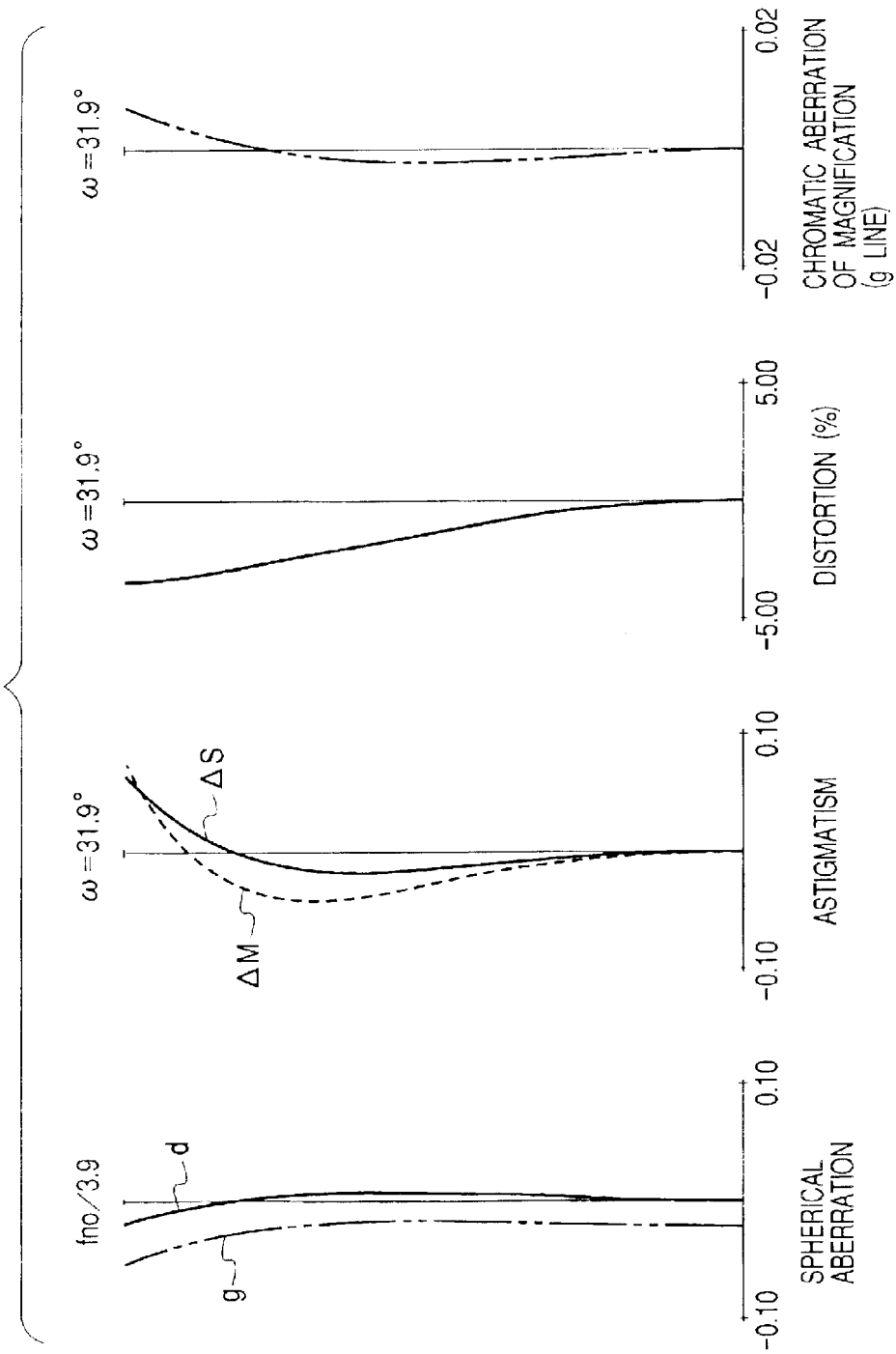
FIG. 4 shows various aberrations of the lens system of Numerical Embodiment 2.
Figure 5:
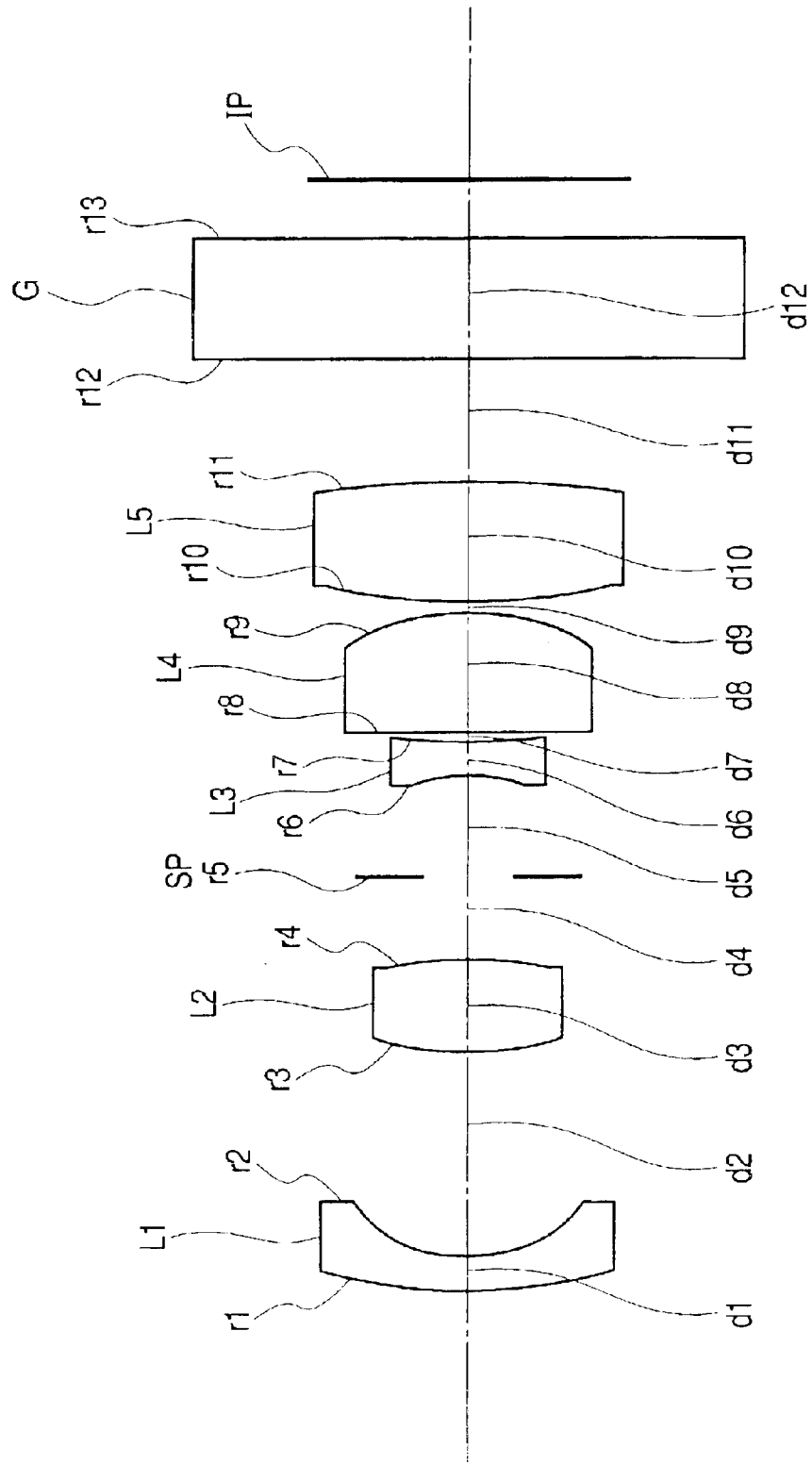
FIG. 5 is a lens sectional view of a lens system of Numerical Embodiment 3.
Figure 6:
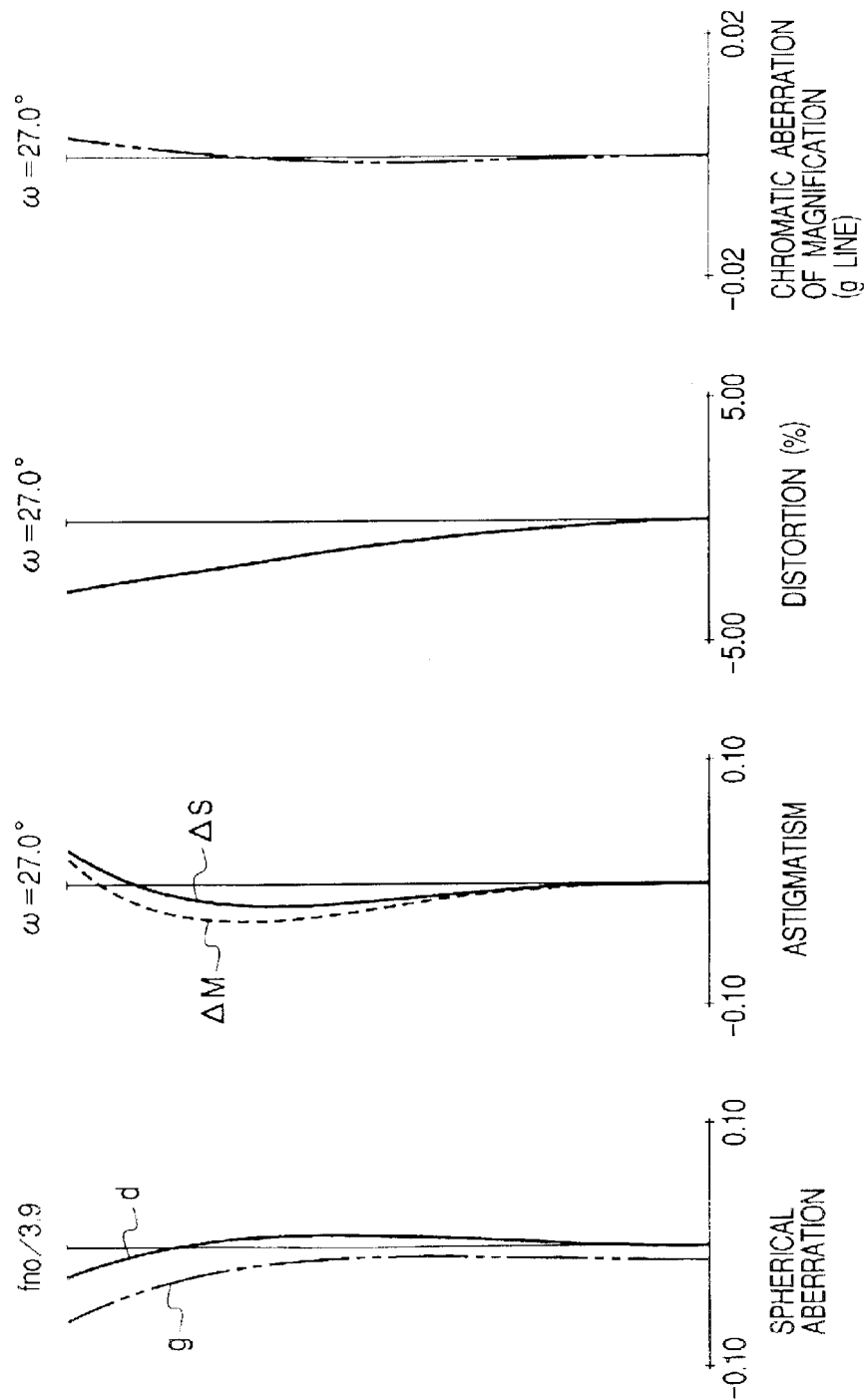
FIG. 6 shows various aberrations of the lens system of Numerical Embodiment 3.
Figure 7:
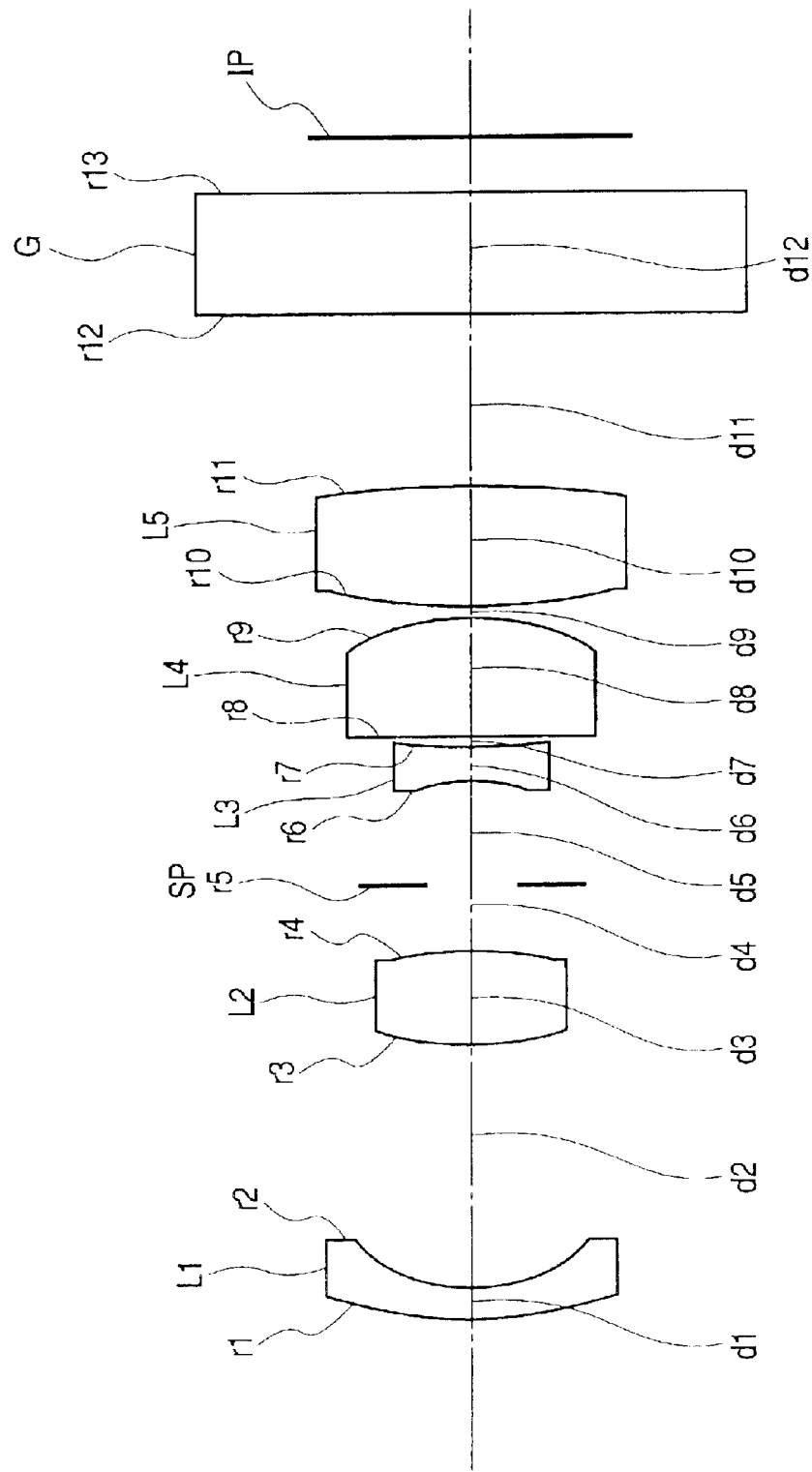
FIG. 7 is a lens sectional view of a lens system of Numerical Embodiment 4.
Figure 8:
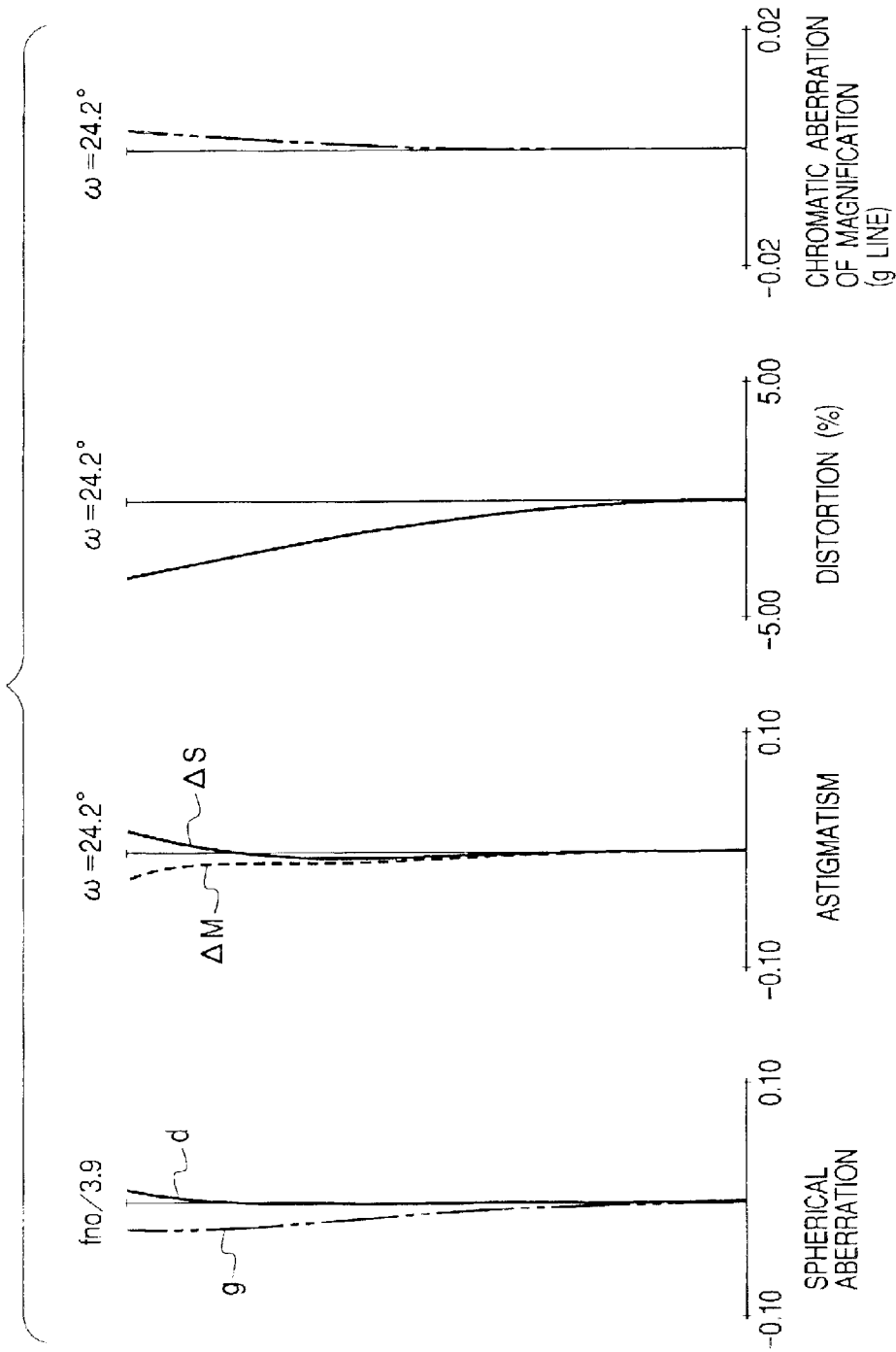
FIG. 8 shows various aberrations of the lens system of Numerical Embodiment 4.
Figure 9:
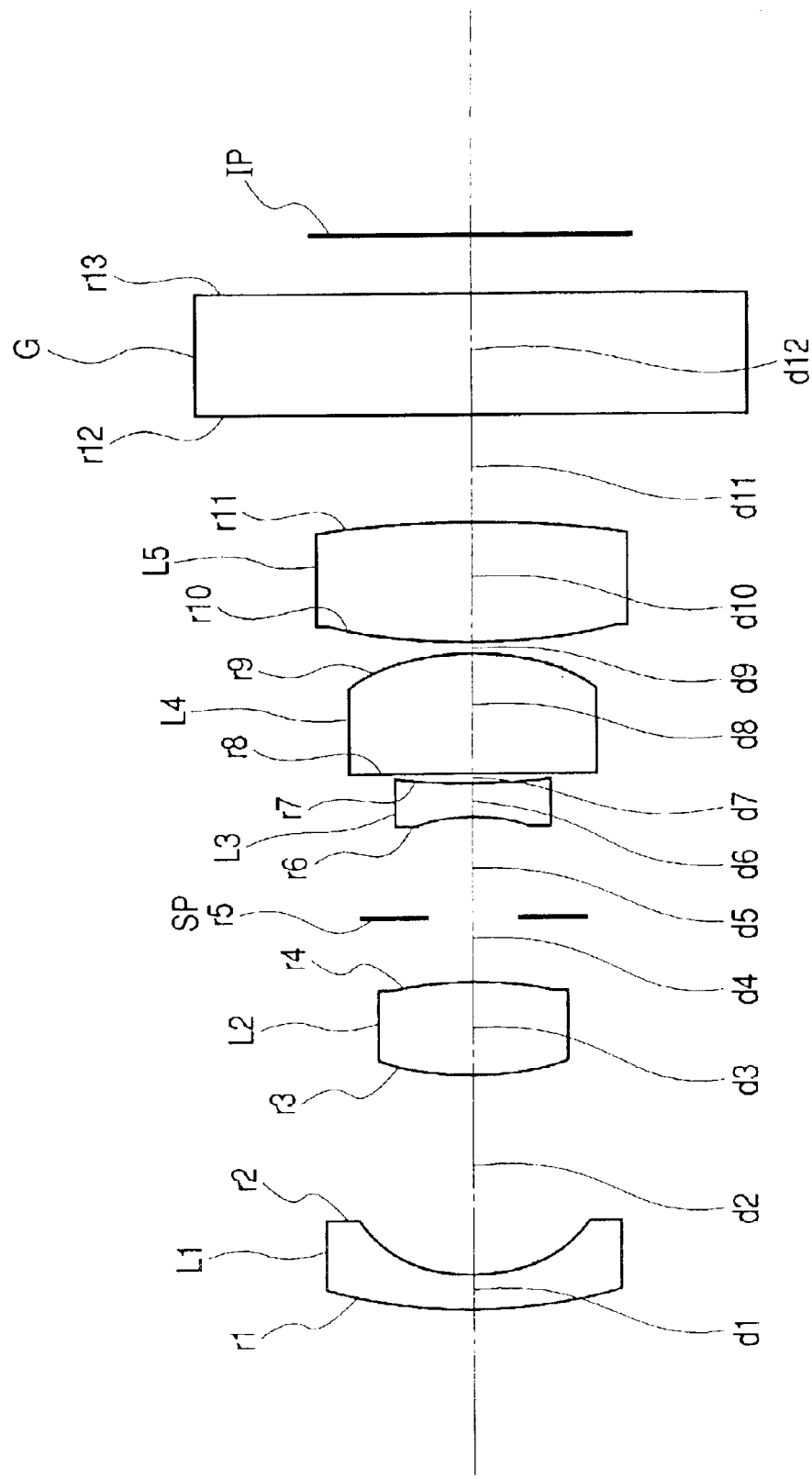
FIG. 9 is a lens sectional view of a lens system of Numerical Embodiment 5.
Figure 10:
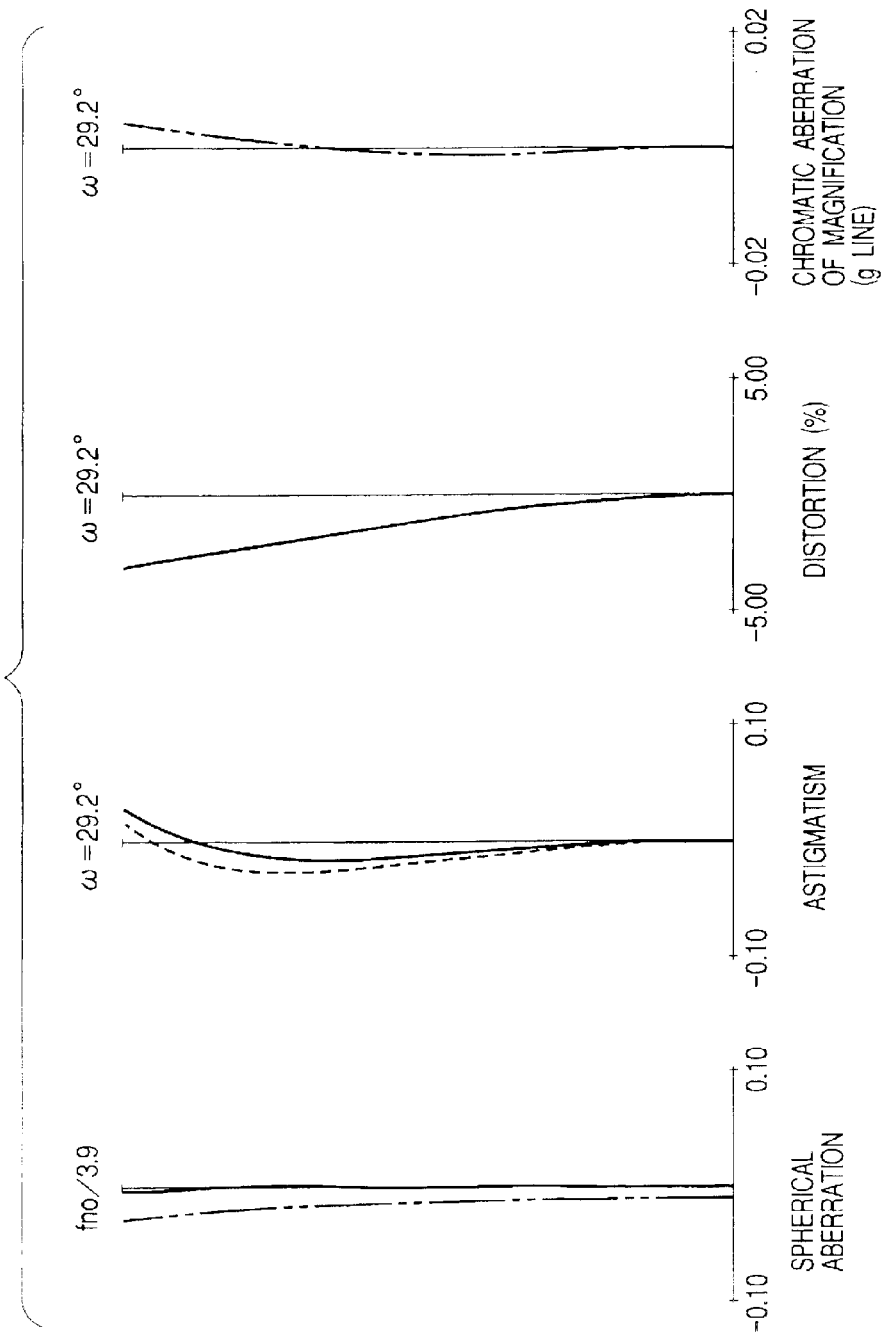
FIG. 10 shows various aberrations of the lens system of Numerical Embodiment 5.
Figure 11:
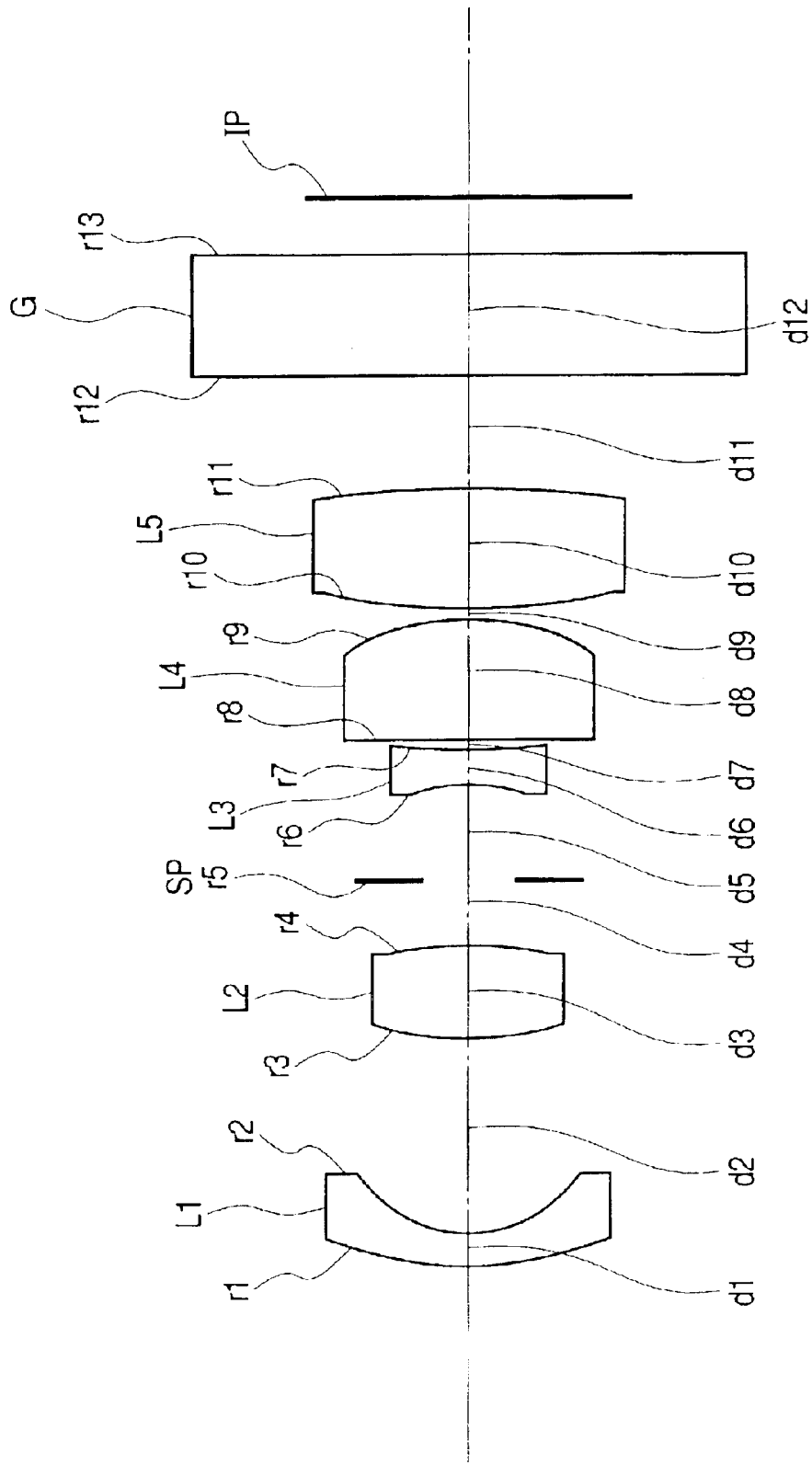
FIG. 11 is a lens sectional view of a lens system of Numerical Embodiment 6.
Figure 12:
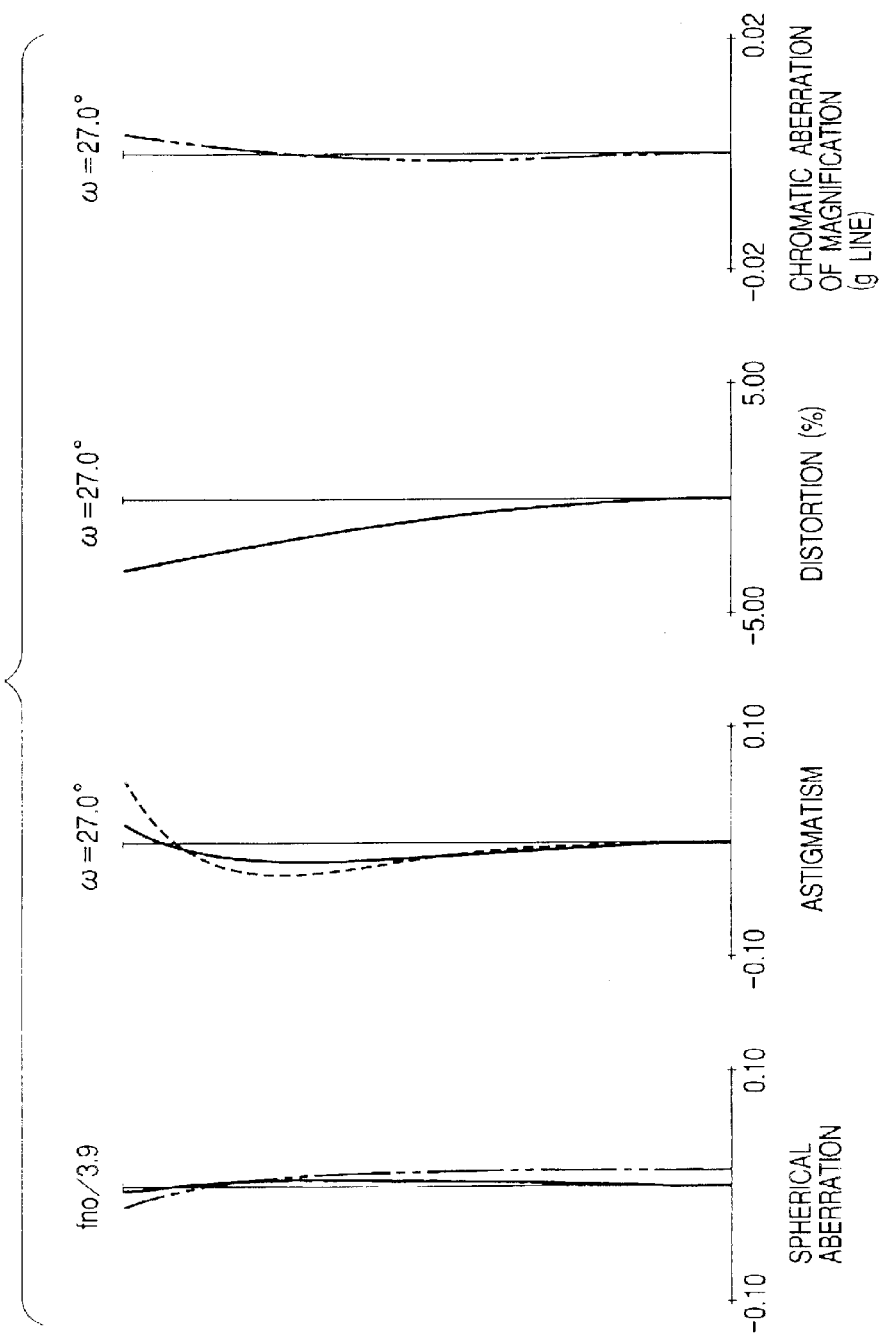
FIG. 12 shows various aberrations of the lens system of Numerical Embodiment 6.

Hereinafter, embodiments of a lens system and an image pickup device using the same according to the present invention will be described with reference to the drawings.

FIGS. 1, 3, 5, 7, 9, and 11 respectively are lens sectional views of lens systems of Numerical Embodiments 1 to 6. FIGS. 2, 4, 6, 8, 10, and 12 respectively show various aberrations of the lens systems of respective Numerical Embodiments.

The lens system of this embodiment is a photographing lens system used for an image pickup device. In the respective lens sectional views, the left is an object side (front) and the right is an image plane side (rear). In this embodiment, as described above, respective lens shapes and the like are set according to a lens structure in which five lenses are used for five groups (lens structure in which each of the five groups is composed of a single lens). Thus, a low cost retro focus type lens having a satisfactory optical performance, a small size, and a simple structure can be obtained.

The lens system according to this embodiment is composed of five lenses, that is, a first lens L1 of negative refracting power (optical power=reciprocal of focal length) having a meniscus shape whose convex surface faces the object side, a second biconvex lens L2 of positive refracting power, an aperture stop SP, a third biconcave lens L3 of negative refracting power, a fourth lens L4 of positive refracting power, and a fifth biconvex lens L5 of positive refracting power, which are disposed in order from the object side. The fourth lens L4 has a meniscus shape whose convex surface faces the image side in Numerical Embodiments 1, 4, and 6 and has a biconvex shape in Numerical Embodiments 2, 3, and 5.

A glass block G corresponding to an optical low pass filter or an infrared cut filter and a solid-state image pickup element (photoelectric conversion element) which is composed of a CCD sensor or a CMOS sensor and includes a photosensitive surface IP for receiving an image formed by the lens system are provided in the rear of the lens system.

In Numerical Embodiments 1 to 3, an aspheric surface is located on the image side surface of the second lens L2. In Numerical Embodiment 4, the aspheric surface is located on the object side surface. Thus, when the aspheric surface is located in the vicinity of the aperture stop SP, a spherical aberration and a comatic aberration by which the entire region of a screen is influenced can be satisfactorily corrected.

Also, a material of the second lens L2 in Numerical Embodiment 4 is plastic (synthetic resin), so that manufacturing at a relatively low cost is possible.

In Numerical Embodiments 5 and 6, the aspheric surface is located on the object side surface of the third lens L3. When the aspheric surface is located in the vicinity of the aperture stop SP as in the case of the second lens L2, a spherical aberration and a comatic aberration by which the entire region of a screen is influenced can be satisfactorily corrected. Further, when the aperture stop SP is disposed between the second lens L2 and the third lens L3, an exit pupil distance suitable to a recent image pickup element is obtained.

Next, a technical meaning of the above-mentioned respective conditional expressions will be described.

The conditional expression (1) is a conditional expression related to the interval between the second lens L2 and the third lens L3. When the interval is narrowed to be less than a lower limit, it is difficult to dispose the aperture stop SP. Thus, a sufficient exit pupil distance cannot be obtained. Conversely, if the interval is widened to be more than an upper limit, a lens diameter of the entire lens is made large and a height in which an off-axis light flux is passed becomes relatively higher. As a result, a problem in that the correction of off-axis aberration becomes difficult is caused.

The conditional expression (2) is a conditional expression related to the refractive index of the second lens L2 and indicates an upper limit usable in view of correcting particularly a curvature of field of a glass material in which a manufacturing cost is low and a refractive index is low.

The conditional expression (3) is a conditional expression related to the back focal distance. When the back focal distance is lengthened to be more than an upper limit of the conditional expression, the entire length becomes longer, thereby increasing a size. Thus, the power of the first lens L1 becomes stronger, so that it is difficult to correct a distortion aberration. Conversely, when the back focal distance is shortened to be less than a lower limit, it is difficult to interpose an optical low pass filter or a color filter such as an infrared cut filter.

The conditional expression (4) is a conditional expression related to the interval between the first lens L1 and the second lens L2. When the interval is narrowed to be less than a lower limit, it is difficult to obtain a sufficient back focal distance. If the back focal distance is forcedly lengthened, the power of the first lens L1 becomes stronger, so that aberration correction becomes difficult and the sensitivity of performance deterioration to parallel and tilt eccentricities of the first lens L1 becomes higher. Conversely, when the interval is widened to be more than an upper limit, the outside diameter of the first lens L1 is made large and the back focal distance is made too long. Thus, a problem in that the size of the entire lens is increased is caused.

The conditional expression (5) is a conditional expression related to a ratio between the focal length of the front lens group and that of the rear lens group which sandwich the aperture stop SP. When the ratio is less than a lower limit, a curvature of field is overcorrected, which is not preferable. In addition, when the ratio exceeds an upper limit, the entire length tends to increase, which is not preferable.

The conditional expression (6) is a conditional expression related to a ratio between the focal length of the fourth lens L4 and that of the fifth lens L5. When the ratio is less than a lower limit, a distortion is undercorrected, which is not preferable. In addition, when the ratio exceeds an upper limit, a curvature of field is undercorrected, which is not preferable.

Figure 13:
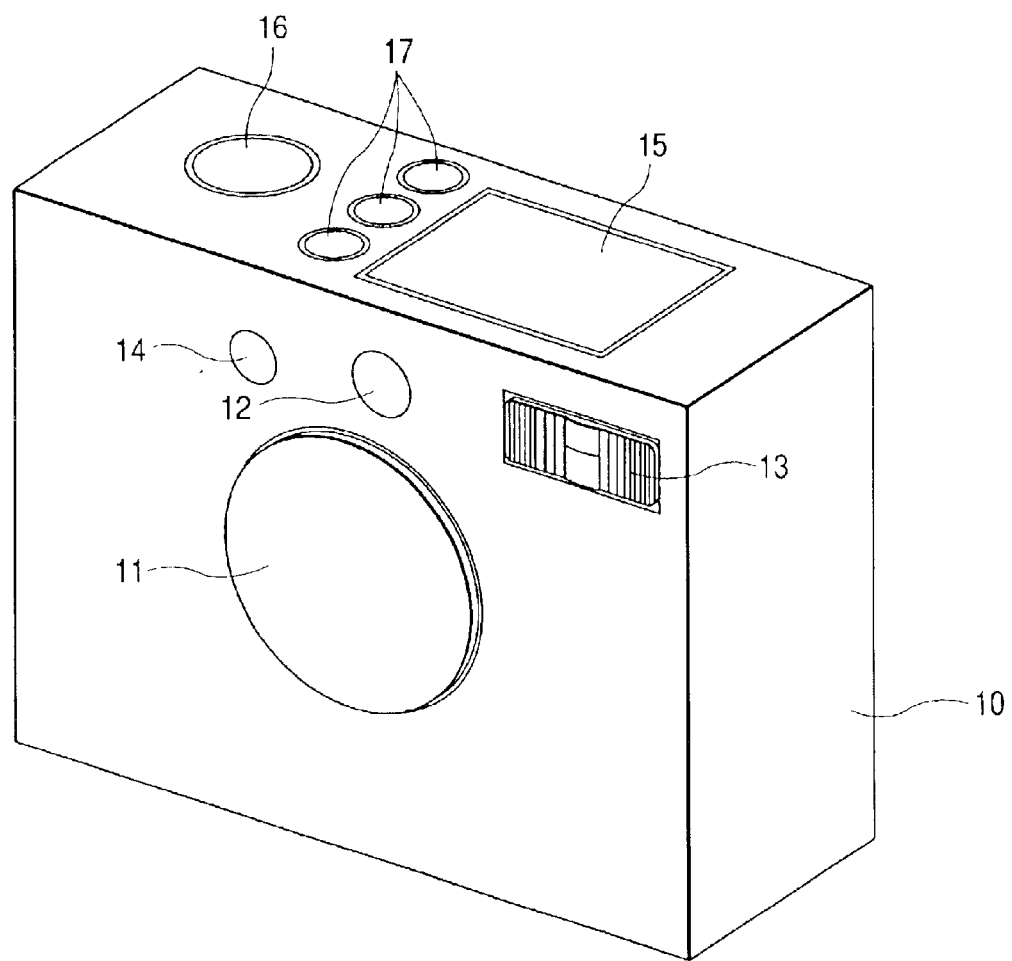
FIG. 13 is a schematic view of a main part of an image pickup device using the lens system of the present invention.

Next, an embodiment of a digital still camera (image pickup device) using the lens system of the present invention as a photographing optical system will be described with reference to FIG. 13. In FIG. 13, reference numeral 10 denotes a camera main body, 11 denotes a photographing optical system composed of the lens system of the present invention, and 12 denotes a finder for observing a subject image. An image formed by the photographing optical system 11 is formed on the photosensitive surface of a photoelectric conversion element which is not shown. The photoelectric conversion element converts received image information into an electrical signal. Reference numeral 13 denotes a strobe device, 14 denotes a measurement window, 15 denotes a liquid crystal display window for informing of operation, 16 denotes a release button, and 17 denotes operation switches for switching among various modes.

Next, numerical data in Numerical Embodiments 1 to 6 will be indicated. In the respective numerical embodiments, reference symbol i denotes the order of arrangement of optical surfaces from the object side, ri denotes the radius of curvature of an i-th optical surface (i-th surface), di denotes an interval between the i-th surface and the (i+1)th surface, and ni and vi respectively denote the refractive index and Abbe number of a material of the i-th optical member with respect to a d-line.

Also, two surfaces located in the nearest side of an image are surfaces composing the glass block G. Reference symbol f denotes a focal length, fno denotes an F number, and ω denotes a half angle of view. In addition, when k is given as an eccentricity (conic constant), B, C, D, and E are given as aspherical coefficients, and x is given as a displacement in an optical axis direction at a position of height h from the optical axis using as a reference, an aspherical shape is expressed by $$x = \frac{(1/r)h^2}{1+\sqrt{\{1-(1+k)(h/r)^2\}}} + Bh^4 + Ch^6 + Dh^8 + Eh^{10}$$

where r denotes a paraxial radius of curvature. In addition, for example, the display of "D-Z" means "$10^{-Z}$". Correspondences with the above-mentioned conditional expressions in the respective numerical embodiments are indicated in Table 1.

Numerical Embodiment 1

| f = 5.000 | fno = 1:3.9 | 2ω = 58.4° |
|---|---|---|
| r1 = 11.406 | d1 = 0.60 | n1 = 1.51633 | v1 = 64.1 |
| r2 = 2.866 | d2 = 4.50 | | |
| r3 = 5.898 | d3 = 1.70 | n2 = 1.69680 | v2 = 55.5 |
| r4 = −6.979 | d4 = 1.34 | | |
| r5 = (stop) | d5 = 1.71 | | |
| r6 = −3.030 | d6 = 0.60 | n3 = 1.84666 | v3 = 23.8 |
| r7 = 10.297 | d7 = 0.16 | | |
| r8 = −867.093 | d8 = 2.20 | n4 = 1.80400 | v4 = 46.6 |
| r9 = −4.268 | d9 = 0.20 | | |
| r10 = 9.319 | d10 = 2.20 | n5 = 1.77250 | v5 = 49.6 |
| r11 = −21.805 | d11 = 1.75 | | |
| r12 = ∞ | d12 = 2.20 | n6 = 1.51633 | v6 = 64.1 |
| r13 = ∞ | | | | aspherical coefficient

| surface number | curvature | K | B |
|---|---|---|---|
| 4 | −6.97903D+00 | −1.93134D+01 | −6.10087D−03 |

| C | D | E |
|---|---|---|
| 9.20910D−04 | −6.74860D−05 | −5.63505D−06 |

Numerical Embodiment 2

| f = 4.502 | fno = 1:3.9 | 2ω = 63.8° |
|---|---|---|
| r1 = 27.269 | d1 = 0.60 | n1 = 1.51633 | v1 = 64.1 |
| r2 = 2.647 | d2 = 3.89 | | |
| r3 = 5.079 | d3 = 1.70 | n2 = 1.60970 | v2 = 57.8 |
| r4 = −5.083 | d4 = 1.37 | | |
| r5 = (stop) | d5 = 1.64 | | |
| r6 = −3.259 | d6 = 0.60 | n3 = 1.84666 | v3 = 23.8 |
| r7 = 8.290 | d7 = 0.16 | | |
| r8 = 54.921 | d8 = 2.20 | n4 = 1.80400 | v4 = 46.6 |
| r9 = −4.127 | d9 = 0.20 | | |
| r10 = 14.360 | d10 = 2.20 | n5 = 1.77250 | v5 = 49.6 |
| r11 = −13.003 | d11 = 1.65 | | |
| r12 = ∞ | d12 = 2.20 | n6 = 1.51633 | v6 = 64.1 |
| r13 = ∞ | | | | aspherical coefficient

| surface number | curvature | K | B |
|---|---|---|---|
| 4 | −5.08333D+00 | −7.95730D+00 | −4.46688D−03 |

| C | D | E |
|---|---|---|
| 4.40110D−04 | −6.16769D−05 | 1.42260D−05 |

Numerical Embodiment 3

| f = 5.501 | fno = 1:3.9 | 2ω = 54.0° |
|---|---|---|
| r1 = 13.628 | d1 = 0.60 | n1 = 1.51633 | v1 = 64.1 |
| r2 = 2.655 | d2 = 3.71 | | |
| r3 = 4.907 | d3 = 1.77 | n2 = 1.58313 | v2 = 59.4 |
| r4 = −5.304 | d4 = 1.50 | | |
| r5 = (stop) | d5 = 1.73 | | |
| r6 = −3.304 | d6 = 0.60 | n3 = 1.84666 | v3 = 23.8 |
| r7 = 9.127 | d7 = 0.24 | | |
| r8 = 96.618 | d8 = 2.20 | n4 = 1.80400 | v4 = 46.6 |
| r9 = −4.948 | d9 = 0.20 | | |
| r10 = 11.761 | d10 = 2.20 | n5 = 1.77250 | v5 = 49.6 |
| r11 = −13.971 | d11 = 2.27 | | |
| r12 = ∞ | d12 = 2.20 | n6 = 1.51633 | v6 = 64.1 |
| r13 = ∞ | | | | aspherical coefficient

| surface number | curvature | K | B |
|---|---|---|---|
| 4 | −5.30396D+00 | −8.20862D+00 | −4.58124D−03 |

| C | D | E |
|---|---|---|

-continued

| | | |
|---|---|---|
| 5.16377D−04 | −5.40431D−05 | 3.94434D−06 |

Numerical Embodiment 4

| f = 6.234 | fno = 1:3.9 | 2ω = 48.4° | |
|---|---|---|---|
| r1 = 8.425 | d1 = 0.60 | n1 = 1.60311 | ν1 = 60.6 |
| r2 = 3.146 | d2 = 4.53 | | |
| r3 = 4.120 | d3 = 1.76 | n2 = 1.49171 | ν2 = 57.4 |
| r4 = −5.799 | d4 = 1.26 | | |
| r5 = (stop) | d5 = 2.03 | | |
| r6 = −2.441 | d6 = 0.60 | n3 = 1.84666 | ν3 = 23.8 |
| r7 = 22.473 | d7 = 0.17 | | |
| r8 = −21.746 | d8 = 2.20 | n4 = 1.77250 | ν4 = 49.6 |
| r9 = −4.065 | d9 = 0.20 | | |
| r10 = 10.759 | d10 = 2.20 | n5 = 1.77250 | ν5 = 49.6 |
| r11 = −16.659 | d11 = 3.26 | | |
| r12 = ∞ | d12 = 2.20 | n6 = 1.51633 | ν6 = 64.1 |
| r13 = ∞ | | | | aspherical coefficient

| surface number | curvature | K | B |
|---|---|---|---|
| 3 | 4.11991D+00 | −2.88604D−01 | −1.03810D−03 |

| | C | D | E |
|---|---|---|---|
| | −4.74420D−05 | −3.32298D−05 | 9.04682D−07 |

Numerical Embodiment 5

| f = 5.000 | fno = 1:3.9 | 2ω = 58.4° | |
|---|---|---|---|
| r1 = 11.166 | d1 = 0.60 | n1 = 1.51633 | ν1 = 64.1 |
| r2 = 2.623 | d2 = 3.61 | | |
| r3 = 5.638 | d3 = 1.59 | n2 = 1.69680 | ν2 = 55.5 |
| r4 = −7.009 | d4 = 1.35 | | |
| r5 = (stop) | d5 = 1.77 | | |
| r6 = −2.852 | d6 = 0.60 | n3 = 1.84666 | ν3 = 23.8 |
| r7 = 11.229 | d7 = 0.13 | | |
| r8 = 30.862 | d8 = 2.20 | n4 = 1.80400 | ν4 = 46.6 |
| r9 = −4.193 | d9 = 0.20 | | |
| r10 = 10.534 | d10 = 2.20 | n5 = 1.77250 | ν5 = 49.6 |
| r11 = −18.389 | d11 = 1.88 | | |
| r12 = ∞ | d12 = 2.20 | n6 = 1.51633 | ν6 = 64.1 |
| r13 = ∞ | | | |

-continued aspherical coefficient

| surface number | curvature | K | B |
|---|---|---|---|
| 6 | −2.85236D+00 | −2.48049D−01 | −3.93346D−03 |

| | C | D | E |
|---|---|---|---|
| | −8.86621D−04 | 3.94119D−04 | 4.89602D−06 |

Numerical Embodiment 6

| f = 5.501 | fno = 1:3.9 | 2ω = 54.0° | |
|---|---|---|---|
| r1 = 6.340 | d1 = 0.60 | n1 = 1.51633 | ν1 = 64.1 |
| r2 = 2.376 | d2 = 3.50 | | |
| r3 = 4.977 | d3 = 1.65 | n2 = 1.60311 | ν2 = 60.6 |
| r4 = −5.554 | d4 = 1.17 | | |
| r5 = (stop) | d5 = 1.78 | | |
| r6 = −2.451 | d6 = 0.60 | n3 = 1.84666 | ν3 = 23.8 |
| r7 = 17.391 | d7 = 0.13 | | |
| r8 = −822.664 | d8 = 2.20 | n4 = 1.80400 | ν4 = 46.6 |
| r9 = −3.983 | d9 = 0.20 | | |
| r10 = 10.200 | d10 = 2.20 | n5 = 1.77250 | ν5 = 49.6 |
| r11 = −20.119 | d11 = 1.99 | | |
| r12 = ∞ | d12 = 2.20 | n6 = 1.51633 | ν6 = 64.1 |
| r13 = ∞ | | | | aspherical coefficient

| surface number | curvature | K | B |
|---|---|---|---|
| 6 | −2.45148D+00 | 6.61293D−02 | −2.40423D−03 |

| | C | D | E |
|---|---|---|---|
| | 5.52617D−04 | 3.87562D−06 | −1.65113D−04 |

TABLE 1

| | | Lower limit | Upper limit | Numerical Embodiment 1 | Numerical Embodiment 2 | Numerical Embodiment 3 | Numerical Embodiment 4 | Numerical Embodiment 5 | Numerical Embodiment 6 |
|---|---|---|---|---|---|---|---|---|---|
| Conditional Expression (1) | DB | | | 3.055 | 3.017 | 3.233 | 3.293 | 3.121 | 2.946 |
| | f | | | 5.000 | 4.502 | 5.501 | 6.234 | 5.000 | 5.501 |
| | DB/f | 0.5 | 0.8 | 0.611 | 0.670 | 0.588 | 0.528 | 0.624 | 0.536 |
| Conditional Expression (2) | nd2 | | 1.7 | 1.69680 | 1.60970 | 1.58313 | 1.49171 | 1.69680 | 1.60311 |
| Conditional Expression (3) | bf | | | 4.196 | 4.098 | 4.725 | 5.706 | 4.335 | 4.439 |
| | f | | | 5.000 | 4.502 | 5.501 | 6.234 | 5.000 | 5.501 |
| | bf/f | 0.8 | 1.0 | 0.839 | 0.910 | 0.859 | 0.915 | 0.867 | 0.807 |
| Conditional Expression (4) | DA | | | 4.499 | 3.893 | 3.707 | 4.527 | 3.608 | 3.499 |
| | f | | | 5.000 | 4.502 | 5.501 | 6.234 | 5.000 | 5.501 |
| | DA/f | 0.6 | 1.0 | 0.900 | 0.865 | 0.674 | 0.726 | 0.722 | 0.636 |
| Conditional Expression (5) | fA | | | 4.852 | 4.476 | 5.046 | 5.446 | 5.363 | 5.363 |
| | fB | | | 8.320 | 7.714 | 9.470 | 10.074 | 7.680 | 7.680 |
| | fA/fB | 0.45 | 0.7 | 0.583 | 0.580 | 0.533 | 0.541 | 0.698 | 0.698 |
| Conditional Expression (6) | f4 | | | 5.329 | 4.855 | 5.911 | 6.138 | 4.724 | 4.724 |
| | f5 | | | 8.720 | 9.154 | 8.586 | 8.769 | 8.967 | 8.967 |
| | f5/f4 | 1.4 | 2.0 | 1.636 | 1.885 | 1.452 | 1.429 | 1.898 | 1.898 |

What is claimed is:

1. A lens system comprising:
a first lens of negative optical power having a meniscus shape whose convex surface faces a front;
a second lens of positive optical power forming a biconvex shape;
an aperture stop;
a third lens of negative optical power forming a biconcave shape;
a fourth lens of positive optical power; and
a fifth lens of positive optical power forming a biconvex shape,
the first lens, the second lens of positive optical power forming a biconvex shape, the aperture stop, the third lens of negative optical power forming a biconcave shape, the fourth lens, and the fifth lens of positive optical power forming a biconvex shape being disposed in order from the front to a rear,
wherein the following conditions are satisfied $$0.5 < DB/f < 0.8,$$

$$nd2 < 1.7, \text{ and}$$

$$0.8 < bf/f < 1.0,$$

where DB denotes an interval between the second lens and the third lens, nd2 denotes a refractive index of a material composing the second lens, bf denotes a back focal distance, and f denotes a focal length of an entire system.

2. A lens system according to claim 1, wherein the following conditions are further satisfied $$0.6 < DA/f < 1.0,$$

$$0.45 < fA/fB < 0.7, \text{ and}$$

$$1.4 < f5/f4 < 2.0,$$

where DA denotes an interval between the first lens and the second lens, fA denotes a total focal length from the first lens to the second lens, fB denotes a total focal length from the third lens to the fifth lens, f4 denotes a focal length of the fourth lens, and f5 denotes a focal length of the fifth lens.

3. A lens system according to claim 1, wherein at least one surface of the second lens is an aspheric surface.

4. A lens system according to claim 1, wherein at least one surface of the third lens is an aspheric surface.

5. A lens system according to claim 1, wherein the lens system forms an image on a photosensitive surface of a solid-state image pickup element.

6. An image pickup device comprising:
a lens system according to claim 1; and
a solid-state image pickup element for receiving an image formed by the lens system.

* * * * *